US009110324B2

(12) United States Patent
Cho et al.

(10) Patent No.: US 9,110,324 B2
(45) Date of Patent: Aug. 18, 2015

(54) LIQUID CRYSTAL DISPLAY MODULE, DISPLAY DEVICE SET INCLUDING THE SAME, AND METHOD OF ASSEMBLING LIQUID CRYSTAL DISPLAY MODULE

(71) Applicant: Samsung Display Co., Ltd., Yongin, Gyeonggi-Do (KR)

(72) Inventors: Joo-Woan Cho, Asan-si (KR); Se-Ki Park, Suwon-si (KR); Seong-Sik Choi, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/187,444

(22) Filed: Feb. 24, 2014

(65) Prior Publication Data
US 2014/0168566 A1 Jun. 19, 2014

Related U.S. Application Data

(63) Continuation of application No. 13/834,456, filed on Mar. 15, 2013, now Pat. No. 8,797,478, which is a continuation of application No. 12/575,083, filed on Oct. 7, 2009, now Pat. No. 8,421,947.

(30) Foreign Application Priority Data

Nov. 27, 2008 (KR) .................... 10-2008-0119127

(51) Int. Cl.
*G02F 1/1333* (2006.01)
*G02F 1/1335* (2006.01)
*F21V 8/00* (2006.01)

(52) U.S. Cl.
CPC ........ *G02F 1/133308* (2013.01); *G02B 6/0083* (2013.01); *G02B 6/0088* (2013.01); *G02F 1/133615* (2013.01); *G02F 2001/133314* (2013.01)

(58) Field of Classification Search
USPC .......................................... 349/58
See application file for complete search history.

(56) References Cited

U.S. PATENT DOCUMENTS

| 5,134,505 A | 7/1992 | Tanaka et al. |
| 5,729,310 A | 3/1998 | Horiuchi et al. |
| 5,835,179 A | 11/1998 | Yamanaka |

(Continued)

FOREIGN PATENT DOCUMENTS

| JP | 2002055629 A | 2/2002 |
| JP | 2003-346536 A | 12/2003 |

(Continued)

OTHER PUBLICATIONS

Partial European Search Report dated Jan. 5, 2010 for Application No. 09013279.6-2205, 5 pages.

(Continued)

*Primary Examiner* — Lucy Chien
(74) *Attorney, Agent, or Firm* — Cantor Colburn LLP (57) ABSTRACT

A liquid crystal display ("LCD") module includes a liquid crystal panel, a mold frame provided below the liquid crystal panel and supporting the liquid crystal panel, a light guide plate provided below the mold frame, and a light source assembly coupled to an outside of the mold frame to accommodate the light guide plate therein, the light source assembly partially inserted into the mold frame, and supplying light to the light guide plate.

12 Claims, 11 Drawing Sheets

(56) References Cited

U.S. PATENT DOCUMENTS

| | | |
|---|---|---|
| 2001/0003471 A1 | 6/2001 | Lee et al. |
| 2001/0050731 A1* | 12/2001 | An et al. .................... 349/58 |
| 2002/0113918 A1 | 8/2002 | Hiratsuka et al. |
| 2002/0130985 A1 | 9/2002 | Weindorf et al. |
| 2003/0223020 A1* | 12/2003 | Lee .............................. 349/58 |
| 2003/0223249 A1* | 12/2003 | Lee et al. .................. 362/561 |
| 2006/0103774 A1 | 5/2006 | Han et al. |
| 2006/0152944 A1 | 7/2006 | Nakayoshi et al. |
| 2007/0019127 A1 | 1/2007 | Oohira |
| 2007/0247870 A1 | 10/2007 | Sakai et al. |
| 2008/0100775 A1 | 5/2008 | Hsiao |
| 2008/0123336 A1 | 5/2008 | Arita et al. |
| 2008/0175023 A1 | 7/2008 | Lee et al. |
| 2009/0160745 A1 | 6/2009 | Kim |
| 2013/0194825 A1 | 8/2013 | Nam et al. |

FOREIGN PATENT DOCUMENTS

| | | |
|---|---|---|
| JP | 2005283867 A | 10/2005 |
| JP | 2007-163620 A | 6/2007 |
| JP | 2007232995 A | 9/2007 |
| JP | 2007311327 A | 11/2007 |
| JP | 2008084860 A | 4/2008 |
| JP | 2008165101 A | 7/2008 |
| KR | 1020060122529 A | 11/2006 |
| KR | 1020070053517 A | 5/2007 |
| KR | 1020080027525 A | 3/2008 |

OTHER PUBLICATIONS

Extended European Search Report dated Sep. 23, 2010 for Application No. 09013279.6-2205/2192438, 17 pages.

* cited by examiner

LIQUID CRYSTAL DISPLAY MODULE, DISPLAY DEVICE SET INCLUDING THE SAME, AND METHOD OF ASSEMBLING LIQUID CRYSTAL DISPLAY MODULE

CROSS REFERENCE TO RELATED APPLICATIONS

This application is a continuation application of U.S. application Ser. No. 13/834,456 filed Mar. 15, 2013, which is a continuation application of U.S. application Ser. No. 12/575,083 filed Oct. 7, 2009 and issued as U.S. Pat. No. 8,421,947 on Apr. 16, 2013, which claims priority to Korean Patent Application No. 10-2008-0119127, filed on Nov. 27, 2008, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") module, a display device set including the same, and a method of assembling an LCD module, and more particularly, an LCD module capable of being simply assembled and having a small thickness, a display device set including the same, and a method of assembling an LCD module.

2. Description of the Related Art

A liquid crystal display ("LCD") is one of the most commonly used flat panel displays ("FPDs") and includes two substrates having electrodes formed thereon and a liquid crystal layer interposed therebetween. When a voltage is applied between the electrodes, liquid crystal molecules in the liquid crystal layer are rearranged to adjust the quantity of transmitted light.

Since the liquid crystal molecules change the amount of transmitted light according to the direction and the intensity of an electric field to display an image, the LCD device requires light for displaying images. For example, representative examples of a light source used for the LCD device include a light-emitting diode ("LED"), a cold cathode fluorescent lamp ("CCFL"), and a flat fluorescent lamp ("FFL").

In the related art, the LCD device adopts a side emission type in which CCFL is generally used to emit light to a side surface of a light guide plate. In the side emission type, the LCD device is manufactured manually, not automatically, in terms of its structural characteristics.

BRIEF SUMMARY OF THE INVENTION

It has been determined herein that an assembly process of a prior art liquid crystal display ("LCD") is complicated, and takes a long time to assemble the prior art LCD device.

An aspect of the present invention provides an LCD module that can be simply manufactured and has a small thickness.

Another aspect of the present invention provides a display device set including the LCD module.

Still another aspect of the present invention provides a method of assembling an LCD module.

However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

According to exemplar embodiments of the present invention, there is provided an LCD module including a liquid crystal panel, a mold frame provided below the liquid crystal panel and supporting the liquid crystal panel, a light guide plate provided below the mold frame, and a light source assembly coupled to an outside of the mold frame to accommodate the light guide plate therein, the light source assembly partially inserted into the mold frame, and supplying light to the light guide plate. The light source assembly includes a cover coupled to the mold frame, a printed circuit board ("PCB") provided on the cover and having a circuit pattern disposed thereon, and a plurality of point light source elements connected to the PCB.

According to other exemplary embodiments of the present invention, there is provided a display device set including the LCD module, a set frame surrounding an edge of the LCD module, a front case provided in front of the LCD module and the set frame and having a window through which a display area of the LCD module is exposed, and a rear case coupled to rear surfaces of the LCD module and the set frame.

According to still other exemplary embodiments of the present invention, there is provided a method of assembling an LCD module, the method including sequentially arranging optical sheets, a light guide plate, and a reflecting sheet on a rear surface of a mold frame, coupling the mold frame and a light source assembly such that the light source assembly at least partially covers the rear surface of the mold frame, turning the mold frame over and arranging a liquid crystal panel on a front surface of the mold frame, and adhering a fixing film to a boundary between the liquid crystal panel and the mold frame.

BRIEF DESCRIPTION OF THE DRAWINGS

The above and other aspects, features, and advantages of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper," and the like may be used herein for ease of description to describe one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a liquid crystal display ("LCD") module according to a first exemplary embodiment of the present invention will be described in detail with reference to FIGS. 1 to 9.

Figure 1:
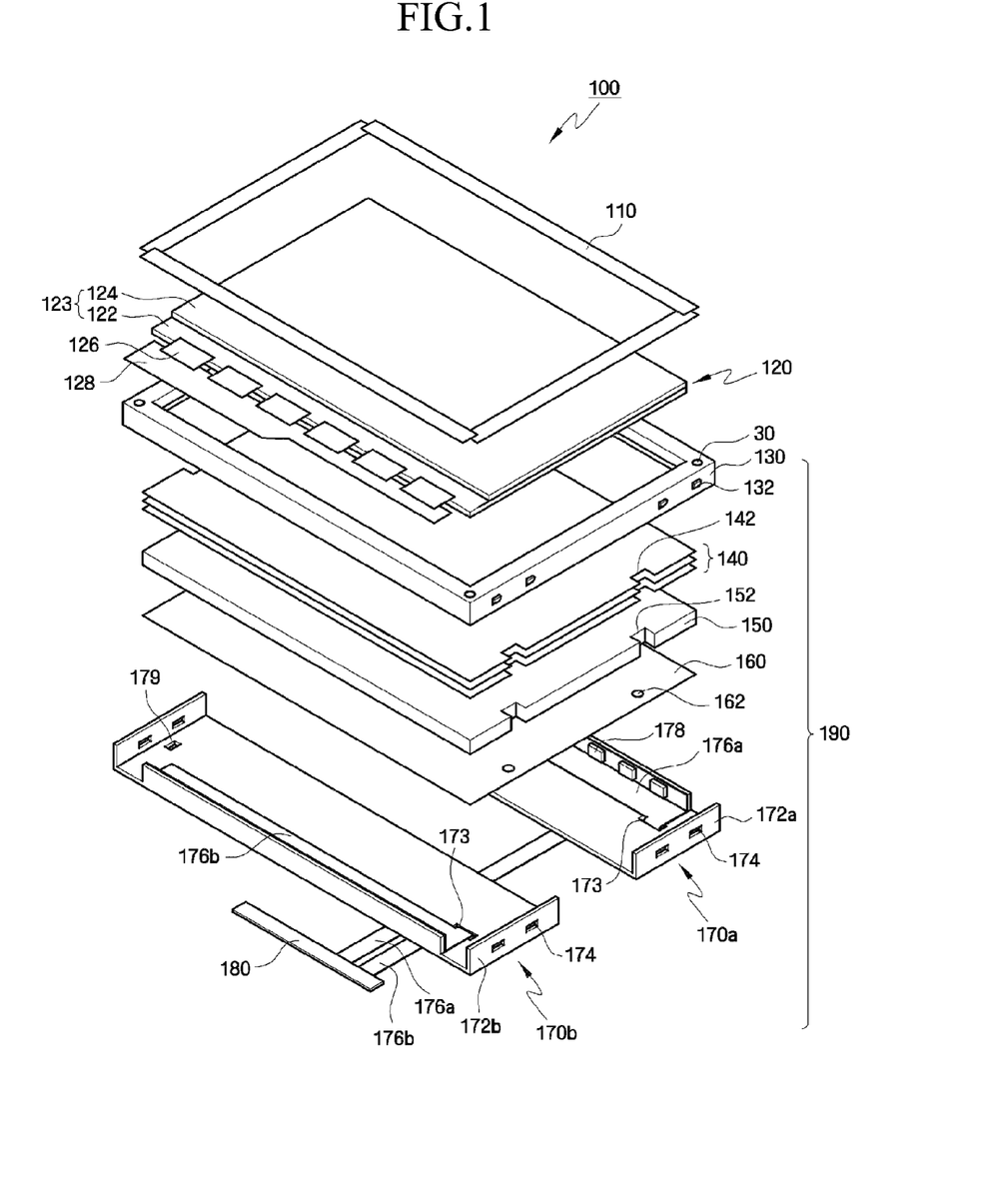
FIG. 1 is an exploded perspective view illustrating an exemplary liquid crystal display ("LCD") module according to a first exemplary embodiment of the present invention.
Figure 2:
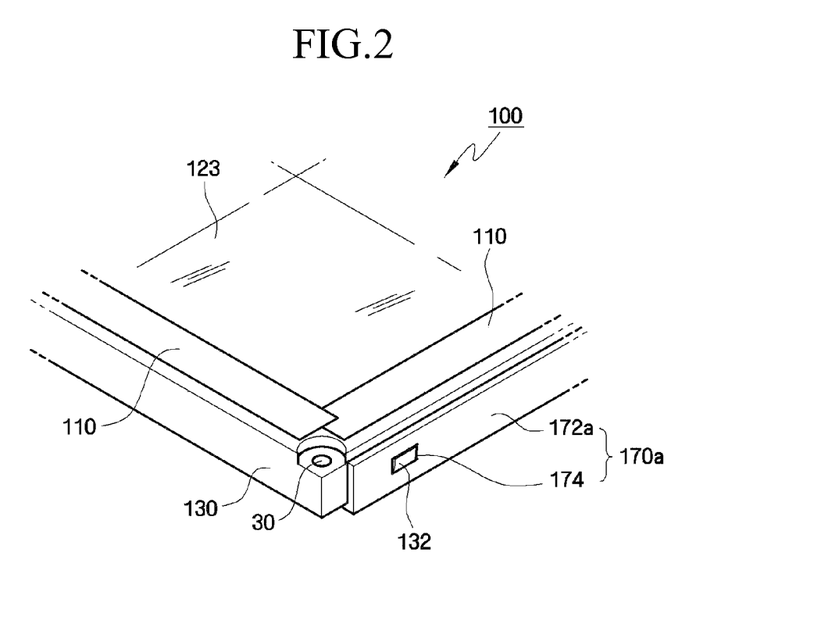
FIG. 2 is a partial perspective view illustrating the exemplary LCD module shown in FIG. 1.
Figure 3:
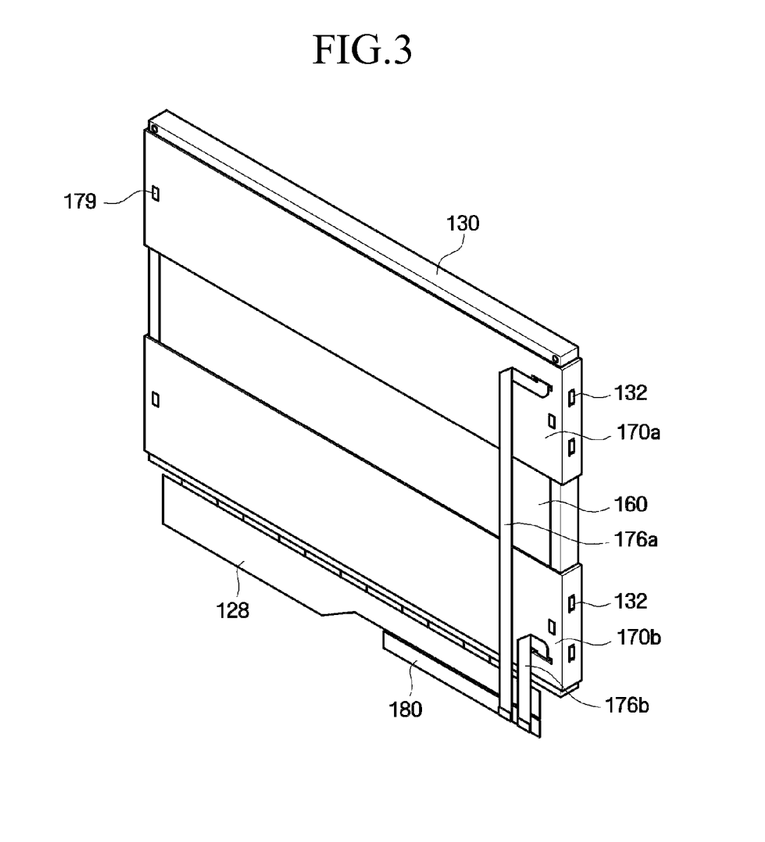
FIG. 3 is a rear perspective view illustrating the exemplary LCD module.

FIG. 1 is an exploded perspective view illustrating the exemplary LCD module according to the first exemplary embodiment of the present invention. FIG. 2 is a partial perspective view illustrating the exemplary LCD module shown in FIG. 1. FIG. 3 is a rear perspective view illustrating the exemplary LCD module.

Referring to FIGS. 1 to 3, an LCD module 100 according to the first exemplary embodiment of the present invention includes a liquid crystal panel assembly 120, a backlight assembly 190, and a fixing film 110.

The liquid crystal panel assembly 120 includes, for example, a liquid crystal panel 123, a chip film package 126, and a source printed circuit board ("PCB") 128.

The liquid crystal panel 123 includes a lower display panel 122 having, for example, gate lines, data lines, a thin film transistor ("TFT") array, and pixel electrodes formed or otherwise disposed thereon, an upper display panel 124 arranged so as to face the lower display panel 122, and a liquid crystal layer interposed between the two display panels. The liquid crystal panel 123 displays image information.

The chip film package 126 is connected to the data lines formed in the lower display panel 122 and provides data driving signals. The chip film package 126 includes a wiring pattern of semiconductor chips formed on a flexible film and a tape automated bonding ("TAB") tape bonded by a TAB technique. For example, as the chip film package, a tape carrier package ("TCP") or a chip on film ("COF") may be used. The chip film package is just an illustrative example.

The gate driver is connected to the gate lines formed or otherwise disposed in the lower display panel 122 and provides gate driving signals. The gate driver may be provided in the form of an integrated circuit ("IC") on the lower display panel 122. That is, the gate driver may be formed together with the TFT array. However, the present invention is not limited thereto. The gate driver may have substantially the same shape as the chip film package 126.

The source PCB 128 is provided with various driving parts that process the gate driving signals input to the gate driver and the data driving signals input to the chip film package 126. That is, the source PCB 128 is connected to the liquid crystal panel 123 and provides image information. In order to minimize the thickness of the LCD module 100, the source PCB 128 may be provided on the same plane as the liquid crystal panel 123. However, the present invention is not limited thereto. Since the source PCB 128 is connected to the liquid crystal panel 123 by the chip film package 126 composed of a flexible film, the source PCB 128 may be bent along one side of the liquid crystal panel 123 and mounted to the rear surface of the liquid crystal panel 123.

The backlight assembly 190 includes, for example, a mold frame 130, optical sheets 140, a light guide plate 150, a reflecting sheet 160, and first and second light source assemblies 170a and 170b.

The light guide plate 150 guides light emitted from the first and second light source assemblies 170a and 170b to the liquid crystal panel 123. The light guide plate 150 may include guide grooves 152, which will be further described below. The light guide plate 150 may be made of a plastic-based transparent material in order to effectively guide light. The light guide plate 150 may be formed of an acrylic resin, such as polymethyl methacrylate ("PMMA"), or polycarbonate. When light incident on one side surface of the light guide plate 150 reaches the upper surface or the lower surface of the guide plate 150 at an angle that is larger than a threshold angle, the light is specularly reflected from the surface of the light guide plate 150 without being emitted to the outside of the light guide plate 150 and uniformly travels through the light guide plate 150. A top surface of the light guide plate 150 corresponds to an emission surface of the light guide plate 150, and a bottom surface of the light guide plate 150 corresponds to a surface which faces the reflection sheet 160. A side surface of the light guide plate 150 connects the upper surface to the lower surface of the light guide plate 150. A first side of the side surface of the light guide plate 150 faces a light emitting portion of the first light source assembly 170a and a second side of the side surface of the light guide plate 150 faces a light emitting portion of the second light source assembly 170b.

A scattering pattern (not shown) is formed or otherwise disposed on at least one of the upper surface and the lower surface of the light guide plate 150 such that light traveling through the light guide plate 150 can be emitted to the liquid crystal panel 123. It is preferable that the scattering pattern be provided on the lower surface of the light guide plate 150. That is, light traveling through the light guide plate 150 is reflected from the scattering pattern and then emitted to the outside of the light guide plate 150 through the upper surface of the light guide plate 150. The size and density of the scattering pattern that is provided on one surface of the light guide plate 150, in order to maintain the brightness of light emitted from the entire surface of the light guide plate 150 to be uniform, may vary depending on the distance from the first and second light source assemblies 170a and 170b. For example, as the distance from the first and second light source assemblies 170a and 170b is increased, the size or the density of the scattering pattern may be increased to maintain the brightness of light emitted from the entire surface of the light guide plate 150 to be uniform. The scattering pattern may be formed by printing ink using a silk-screen printing technique, but the present invention is not limited thereto. Fine grooves or protrusions may be formed on the light guide plate 150 to form a scattering pattern having substantially the same effects as described above.

The first and second light source assemblies 170a and 170 are arranged at opposing sides of the light guide plate 150. In order to emit uniform light to a display screen in this arrangement structure, it is preferable that the light guide plate 150 be formed in a flat type having a substantially uniform thickness. However, the present invention is not limited thereto, but the light guide plate 150 may have various shapes.

The optical sheets 140 are provided on the upper surface of the light guide plate 150 to diffuse and condense light emitted from the light guide plate 150. The optical sheets 140 include, for example, a diffusion sheet, a prism sheet, and a protective sheet. The diffusion sheet provided between the light guide plate 150 and the prism sheet diffuses light incident from the light guide plate 150 to prevent light from being partially focused. The prism sheet may include triangular prisms arranged in a predetermined pattern on the upper surface thereof, and generally includes two sheets arranged such that prism patterns intersect each other. The prism sheet focuses light diffused by the diffusion sheet in a direction that is vertical to the liquid crystal panel 123. Therefore, most of light passing through the prism sheet travels in the vertical direction, and a uniform brightness distribution is obtained on the protective sheet. The protective sheet provided on the prism sheet not only protects the surface of the prism sheet, but also diffuses light to obtain a uniform light distribution. The optical sheets 140 may include guide grooves 142, respectively aligned with guide grooves 152 of the light guide plate 150, as will be further described below. The structures of the optical sheets 140 are not limited to the above, but they may vary depending on the specifications of the LCD module 100.

The reflecting sheet 160 is provided below the light guide plate 150, and reflects light emitted from the lower surface of the light guide plate 150 upward. The reflecting sheet 160 reflects light that has not been reflected from the diffusion sheet of the optical sheets 140 disposed on the emission surface of the light guide plate 150 to the emission surface of the light guide plate 150, thereby reducing the loss of light incident on the liquid crystal panel 123 and improving the uniformity of light emitted from the emission surface of the light guide plate 150. For example, the reflecting sheet 160 may be formed of polyethylene terephthalate ("PET"), and one surface of the reflecting sheet 160 may be coated with a diffusion layer including, for example, a titanium dioxide. When the titanium dioxide is dried, the titanium dioxide forms a white layer like a frost layer. In this way, it is possible to uniformly diffuse light and obtain a predetermined light reflection effect.

The mold frame 130 is a rectangular frame, and is provided at the upper edge of the optical sheets 140. A plurality of hooks 132 is formed on the outer surface of the mold frame 130. User holes 30 are formed at the corners of the mold frame 130, and bolts are inserted into the user holes 30 when a display device set is assembled.

The first light source assembly 170a and the second light source assembly 170b emit light to the first and second sides of the side surface of the light guide plate 150. Specifically, the first light source assembly 170a includes a first cover 172a, a first flexible PCB 176a that is disposed on the first cover 172a and has a circuit pattern disposed thereon, and a plurality of point light source elements 178 connected to the first flexible PCB 176a. Similarly, the second light source assembly 170b includes a second cover 172b, a second flexible PCB 176b that is disposed on the second cover 172b and has a circuit pattern disposed thereon, and a plurality of point light source elements 178 connected to the second flexible PCB 176b. The point light source elements 178 of the first light source assembly 170a are provided at the first side of the light guide plate 150, and the point light source elements 178 of the second light source assembly 170b are provided at the second side of the light guide plate 150, where the first side is opposite to the second side.

The point light source element 178 includes a light-emitting element. For example, as the point light source element 178, a light-emitting diode ("LED"), a glow lamp, or a white halogen lamp may be used. It is preferable to use the LED having high color reproducibility and low power consumption. The point light source element 178 includes a frame (not shown) and red, green, and blue light-emitting chips mounted on the frame. Red, green, and blue light components emitted from the light-emitting chips are mixed with each other to form white light. In this embodiment, the point light source elements 178 are provided in the first light source assembly 170a and the second light source assembly 170b, but the present invention is not limited thereto. For example, line light sources extending along the side walls of the first cover 172a and the second cover 172b may be used.

The point light source elements 178 are connected to one end of the first flexible PCB 176a, and the other end of the first flexible PCB 176a extends to the rear surface of the first cover 172a through an opening 173 formed in the first cover 172a and is then connected to a converter PCB 180. Similarly, the point light source elements 178 are connected to one end of the second flexible PCB 176b, and the other end of the second flexible PCB 176b extends to the rear surface of the second cover 172b through an opening 173 formed in the second cover 172b and is then connected to the converter PCB 180. In order to minimize the thickness of the LCD module 100, the converter PCB 180 is arranged adjacent to the source PCB 128, and may be provided on the same plane as the liquid crystal panel 123, similar to the source PCB 128.

The first cover 172a and the second cover 172b are coupled to the mold frame 130 to accommodate the optical sheets 140, the light guide plate 150, and the reflecting sheet 160 therein. A portion of the reflecting sheet 160 may be exposed to the outside without being covered by the first and second covers 172a and 172b. Hook engaging holes 174 for engaging with the hooks 132 of the mold frame 130 may be formed in the side walls of the first cover 172a and the second cover 172b. However, the present invention is not limited thereto. For example, the hook engaging holes may be formed in the mold frame 130, and the hooks 132 may be formed on the first cover 172a and the second cover 172b. In alternative exemplary embodiments, the mold frame 130 may be coupled to the first and second covers 172a and 172b by various methods using, for example, screws.

The liquid crystal panel 123 is provided on the mold frame 130, and the fixing film 110 is adhered to the boundary between the liquid crystal panel 123 and the mold frame 130 to fix the liquid crystal panel 123 to the mold frame 130. When the fixing film 110 is adhered to the mold frame 130, the user holes 30 formed at the corners of the mold frame 130 may be exposed. The fixing film 110 may be formed integrally with the mold frame 130 along the boundary between the liquid crystal panel 123 and the mold frame 130, or it may be divided into a plurality of parts and the parts may overlap each other. The fixing film 110 not only fixes the liquid crystal panel 123 to the mold frame 130, but also prevents light from leaking from the boundary therebetween. In addition, the fixing film 110 may prevent the generation of noise from the liquid crystal panel 123 due to surrounding electromagnetic waves. For example, a black tape or a conductive tape made of, for example, aluminum (Al) or copper (Cu) may be used as the fixing film 110.

Figure 4A:
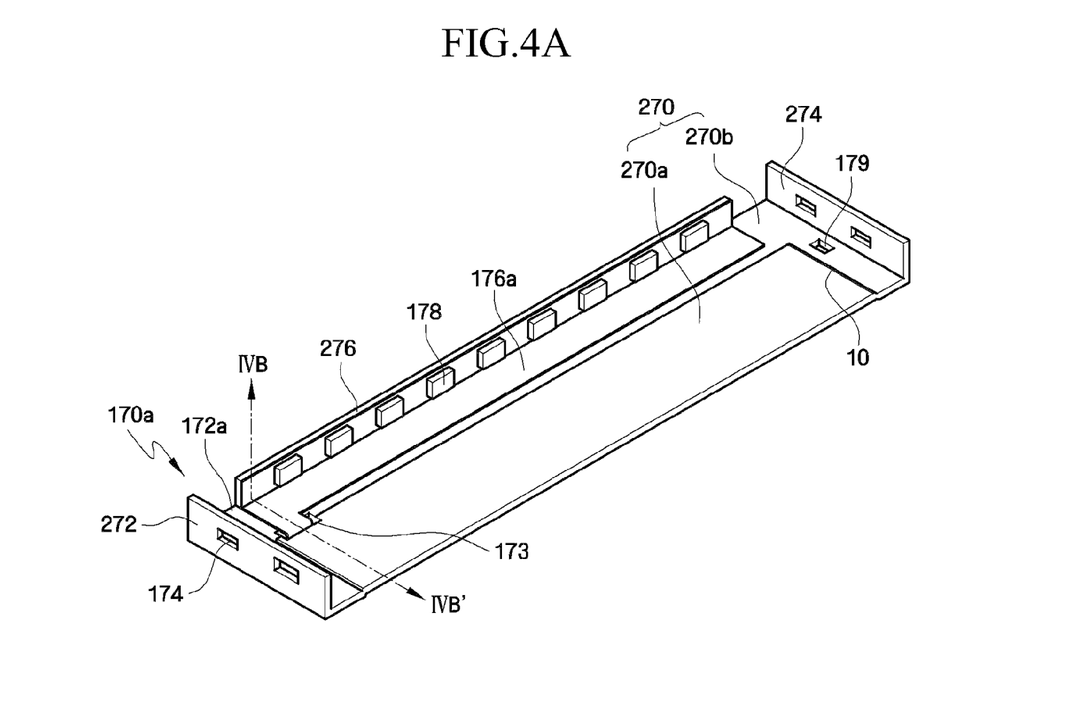
FIG. 4A is a perspective view illustrating an exemplary first light source assembly shown in FIG. 1.
Figure 4B:
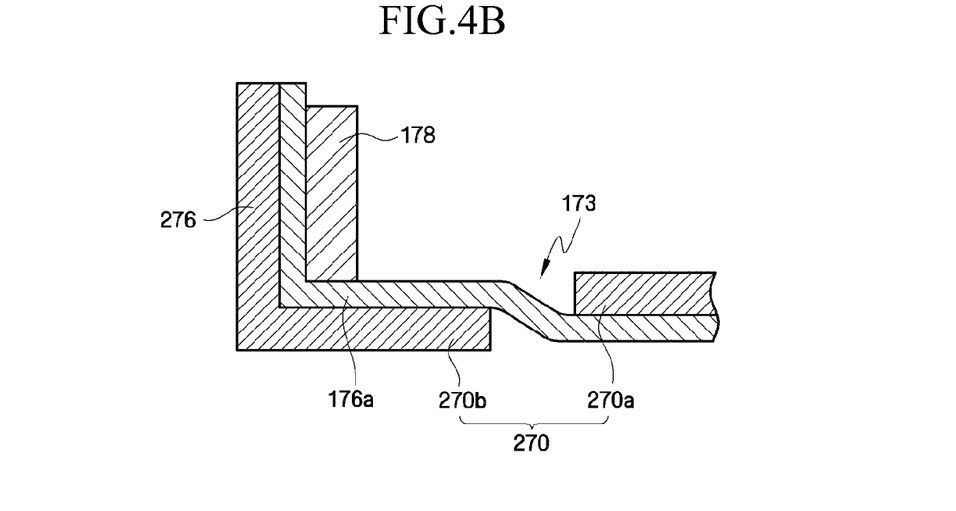
FIG. 4B is a cross-sectional view illustrating the exemplary first light source assembly taken along line IVB-IVB of FIG. 4A.
Figure 5:
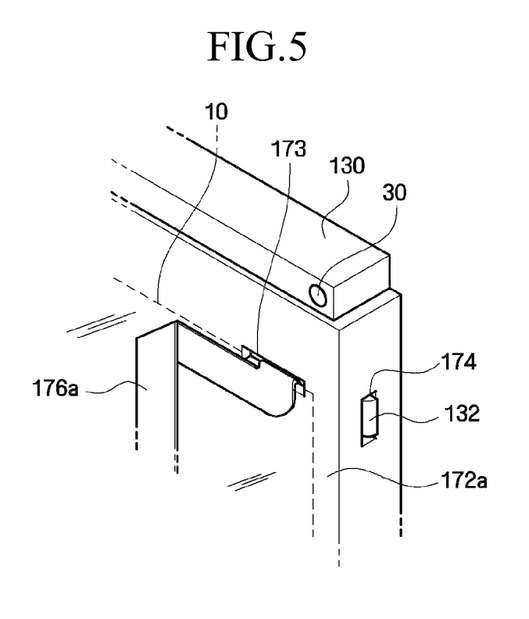
FIG. 5 is a partial rear perspective view illustrating the exemplary LCD module shown in FIG. 3.

Next, the first and second light source assemblies 170a and 170b according to the first exemplary embodiment of the present invention will be described in detail with reference to FIGS. 4A, 4B, and 5. For clarity of description, only the first light source assembly 170a is described, but the second light source assembly 170b may have substantially the same structure as the first light source assembly 170a. FIG. 4A is a perspective view illustrating the exemplary first light source assembly shown in FIG. 1, and FIG. 4B is a cross-sectional view illustrating the exemplary first light source assembly taken along line IVB-IVB of FIG. 4A. FIG. 5 is a partial rear perspective view illustrating the exemplary LCD module shown in FIG. 3.

As shown in FIGS. 4A, 4B, and 5, the first cover 172a of the first light source assembly 170a includes a substantially rectangular plate 270 that covers a portion of the rear surface of the LCD module 100, and first to third side walls 272, 274, and 276 that are formed along the edge of the plate 270. The first side wall 272 and the second side wall 274 are arranged so as to face each other, and have the hook engaging holes 174 formed therein. The third side wall 276 is provided between the first side wall 272 and the second side wall 274, and the point light source elements 178 are provided on the inner surface of the third side wall 276. The first flexible PCB 176a is provided inside the first cover 172a along a portion of the plate 270 and along the third side wall 276, and the point light source elements 178 formed on the first flexible PCB 176a are arranged in a line along the third side wall 276.

In the plate 270, a step portion 10 is formed at the boundary between a central portion 270a and an edge portion 270b. The central portion 270a of the plate 270 protrudes from the step portion 10 so as to be closer to the liquid crystal panel 123 than the edge portion 270b. An opening 173 through which the first flexible PCB 176a passes is formed in the step portion 10. Therefore, one end of the first flexible PCB 176a is arranged at the edge portion 270b that is further away from the liquid crystal panel 123 in the first cover 172a, and the other end of the first flexible PCB 176a passes through the opening 173 and extends to the converter PCB 180 by extending along the rear surface of the central portion 270a of the plate 270. In this way, it is possible to minimize an increase in the overall thickness of the LCD module 100 due to the thickness of the first flexible PCB 176a.

The first side wall 272 and the second side wall 274 are provided outside the mold frame 130 and are coupled to the mold frame 130 by hooks 132 engaging with the hook engaging holes 174. The third side wall 276 is provided inside the mold frame 130, and the point light source elements 178 emit light to the first side of the side surface of the light guide plate 150. The first cover 172a dissipates heat generated from the point light source elements 178, and may be formed of a metal material, such as aluminum (Al), copper (Cu), or iron (Fe). The area of the plate 270 may be adjusted depending on the amount of heat generated from the point light source elements 178.

Insertion holes 179 into which fixing pins (see reference numeral 131 in FIG. 7) of the mold frame 130 are inserted are formed in portions of the plate 270 adjacent to the first side wall 272 and the second side wall 274.

Figure 6:
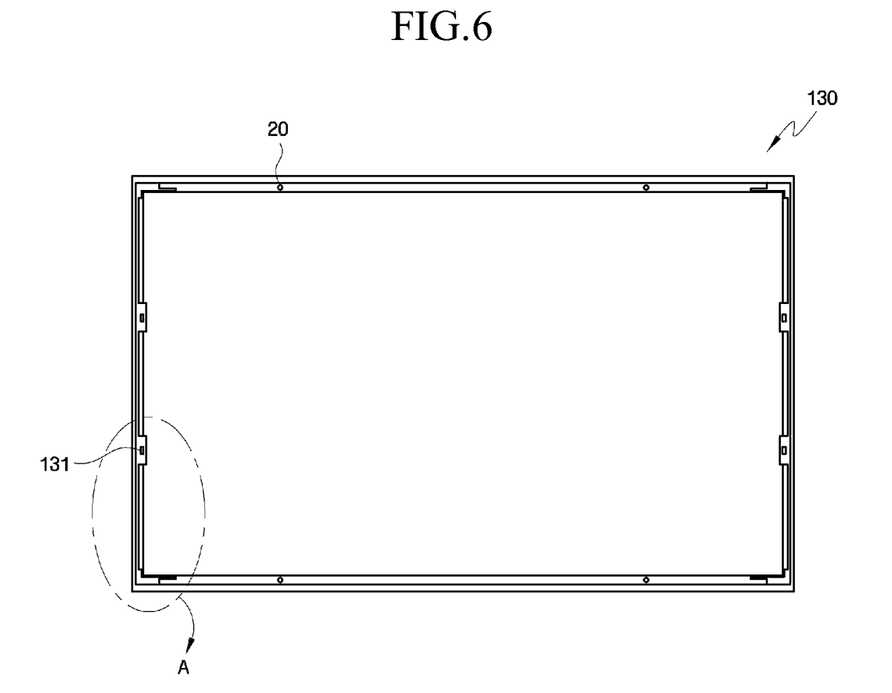
FIG. 6 is a rear view illustrating an exemplary mold frame shown in FIG. 1.
Figure 7:
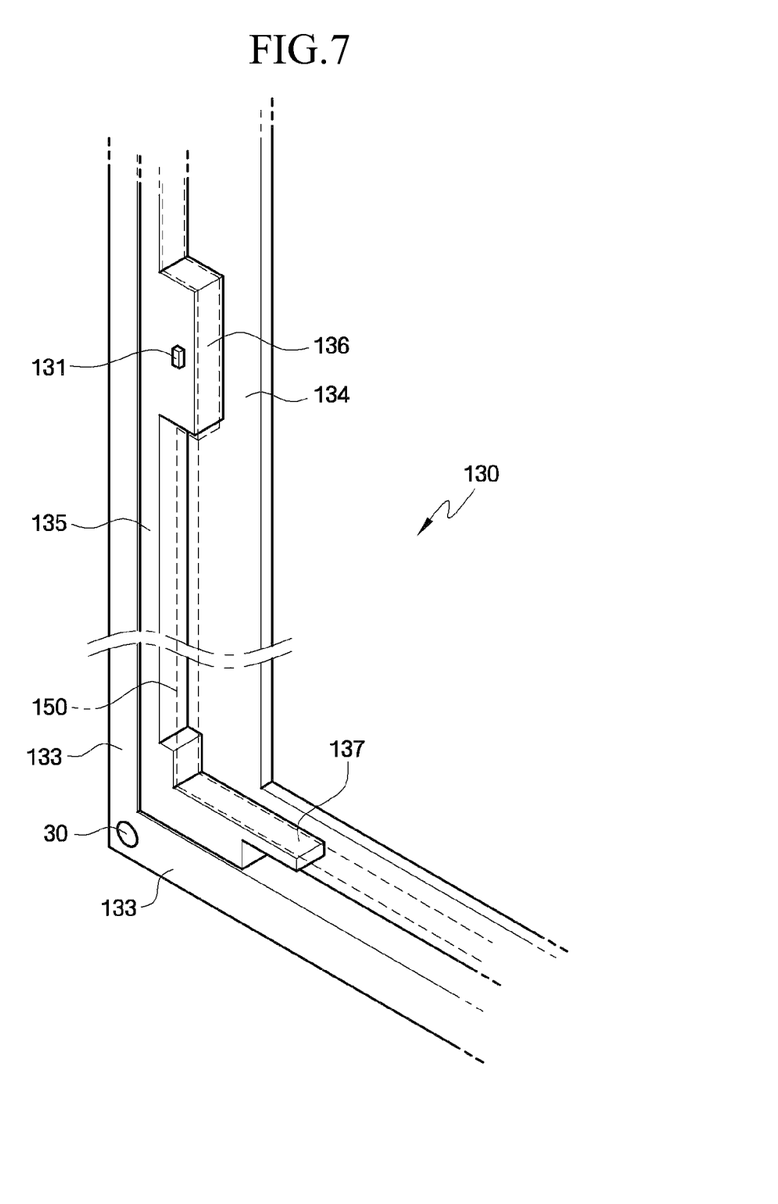
FIG. 7 is an enlarged rear perspective view illustrating portion A shown in FIG. 6.
Figure 8:
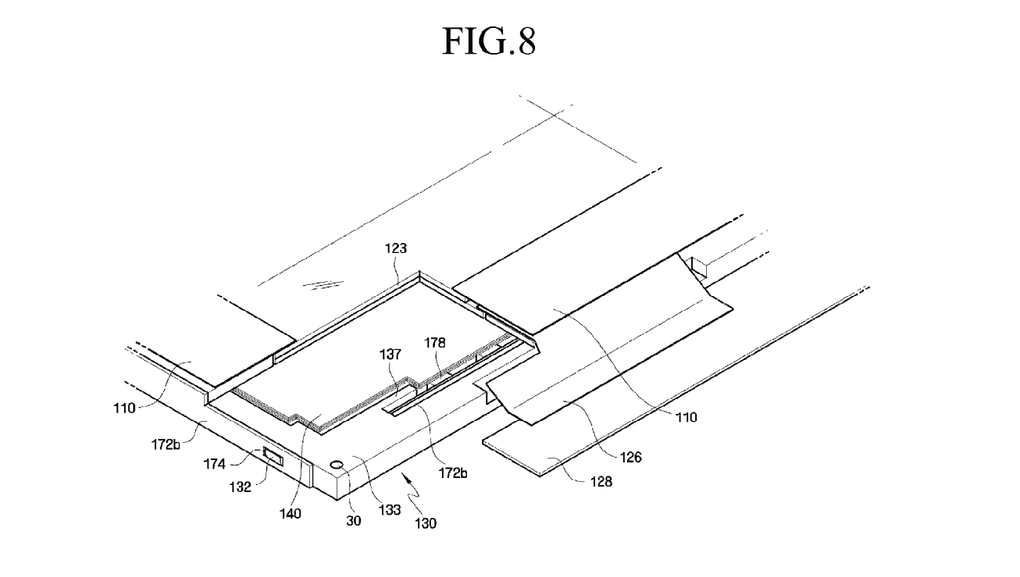
FIG. 8 is a partially cut-away perspective view illustrating the exemplary LCD module shown in FIG. 1.
Figure 9:
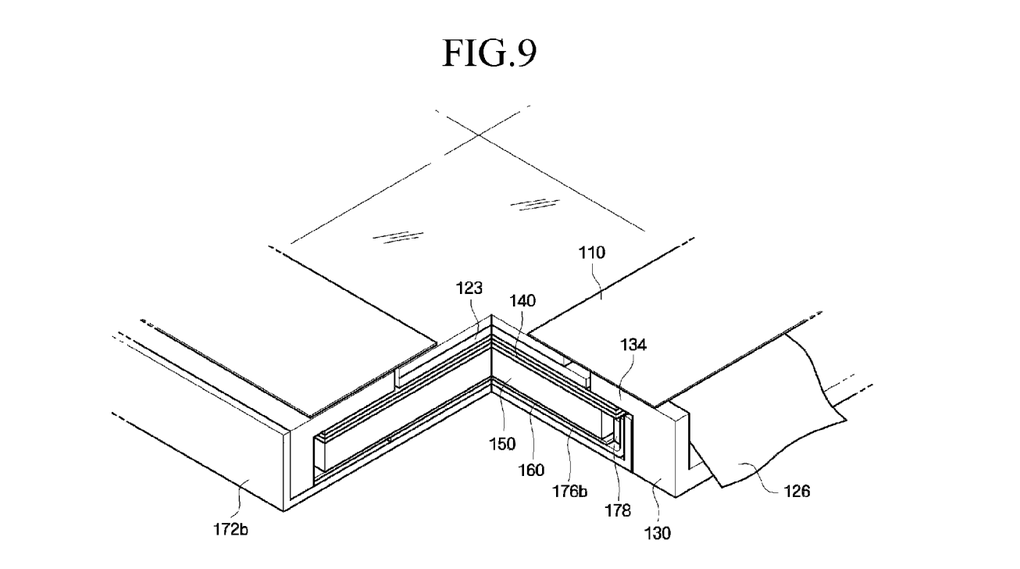
FIG. 9 is a partially cut-away perspective view illustrating the exemplary LCD module shown in FIG. 1.

Next, the coupling relationship between the mold frame 130 and the LCD module 100 according to the first exemplary embodiment of the present invention will be described in detail with reference to FIGS. 6 to 9. FIG. 6 is a rear view illustrating the exemplary mold frame shown in FIG. 1. FIG. 7 is an enlarged rear perspective view illustrating portion A shown in FIG. 6. FIG. 8 is a partially cut-away perspective view illustrating the exemplary LCD module shown in FIG. 1. FIG. 9 is a partially cut-away perspective view illustrating the exemplary LCD module shown in FIG. 1.

Referring to FIGS. 6 to 9, the mold frame 130 includes a rectangular frame-shaped side portion 133, and first and second supporting portions 134 and 135 that protrude inwardly from the side portion 133. The liquid crystal panel 123 is mounted to one surface of the first supporting portion 134, and the optical sheets 140 and the light guide plate 150 are sequentially mounted to the other surface thereof. The second supporting portion 135 is formed on the other surface of the first supporting portion 134 and regulates the arrangement of the optical sheets 140 and the light guide plate 150. The thickness of the second supporting portion 135 may be substantially equal to the sum of the thicknesses of the optical sheets 140 and the light guide plate 150. The guide protruding portion 136 protruding inwardly from the second supporting portion 135 regulates the movement of the optical sheets 140 and the light guide plate 150. Specifically, the guide protruding portions 136 of the mold frame 130 are inserted into guide grooves 142 (FIG. 1) formed at the edges of the optical sheets 140 and guide grooves 152 (FIG. 1) formed at the edge of the light guide plate 150.

The reflecting sheet 160 is mounted on the second supporting portion 135 and the fixing pins 131 are formed on the second supporting portion 135 in order to regulate the movement of the reflecting sheet 160. In this embodiment, the fixing pins 131 are formed on the guide protruding portion 136 of the second supporting portion 135, but the present invention is not limited thereto. The fixing pins 131 may be formed on the second supporting portion 135 at arbitrary positions. The fixing pins 131 are inserted into the insertion holes 162 of the reflecting sheet 160 and the insertion holes 179 of the covers 172a and 172b. Additional fixing pins 20 that protrude downwardly from the mold frame 130 are formed on the first supporting portion 134 or the second supporting portion 135. The additional fixing pins 20 press the reflecting sheet 160 from the upper side to fix the reflecting sheet to the first cover 172a or the second cover 172b.

Fixing protruding portions 137 are formed adjacent to the corners of the mold frame 130 so as to protrude from the second supporting portion 135 substantially in parallel to one side of the side portion 133. An insertion space having a U shape is provided between the fixing protruding portions 137 and the side portion 133, and the third side walls 276 of the covers 172a and 172b are inserted into the insertion space. In particular, edge portions of the third side walls 276 that are not covered by the light source elements 178 may be inserted into the insertion space between the side portion 133 and the fixing protruding portion 137. In this embodiment, the first and second light source assemblies 170a and 170b are coupled to the mold frame 130 to accommodate the optical sheets 140, the light guide plate 150, and the reflecting sheet 160. The first and second side walls 272 and 274 of the first and second covers 172a and 172b are coupled to the mold frame 130 by hooks 132 outside the mold frame 130, and the third side walls 276 of the first and second covers 172a and 172b are inserted and fixed to slots formed in the mold frame 130 between the fixing protruding portion 137 and the side portion 133. Therefore, it is possible to ensure sufficient coupling between the first and second light source assemblies 170a and 170b and the mold frame 130.

As shown in FIG. 9, when the second light source assembly 170b is inserted into the mold frame 130, the light guide plate 150 is arranged on the front surfaces of the point light source elements 178 provided on the second cover 172b, and the upper surfaces of the point light source elements 178 are covered with, or overlapped by, the first supporting portion 134 of the mold frame 130. When the mold frame 130 is made of a reflective material or when the surface of the mold frame 130 is coated with a reflective material, the first supporting portion 134 formed on the upper surfaces of the point light source elements 178 condenses light.

When the first and second light source assemblies 170a and 170b are inserted into the mold frame 130, the plate 270 of the first and second covers 172a and 172b does not protrude from the lowest part of the mold frame 130 to the outside. Therefore, it is possible to minimize the overall thickness of the LCD module 100.

The LCD module 100 is assembled as follows.

First, the optical sheets 140, the light guide plate 150, and the reflecting sheet 160 are sequentially arranged on the rear surface of the first supporting portion 134 of the mold frame 130, with the rear surface of the mold frame 130 facing upward, and the first and second light source assemblies 170a and 170b cover the components to assemble a backlight assembly 190. Then, the mold frame 130 is turned over, and the liquid crystal panel 123 is arranged on the front surface of the mold frame 130 and on the optical sheets 140. Then, the fixing film 110 is adhered to the boundary between the liquid crystal panel 123 and the mold frame 130. According to the LCD module of this exemplary embodiment of the present invention, an assembly process is simple, and it is possible to automate the assembly process.

Figure 10:
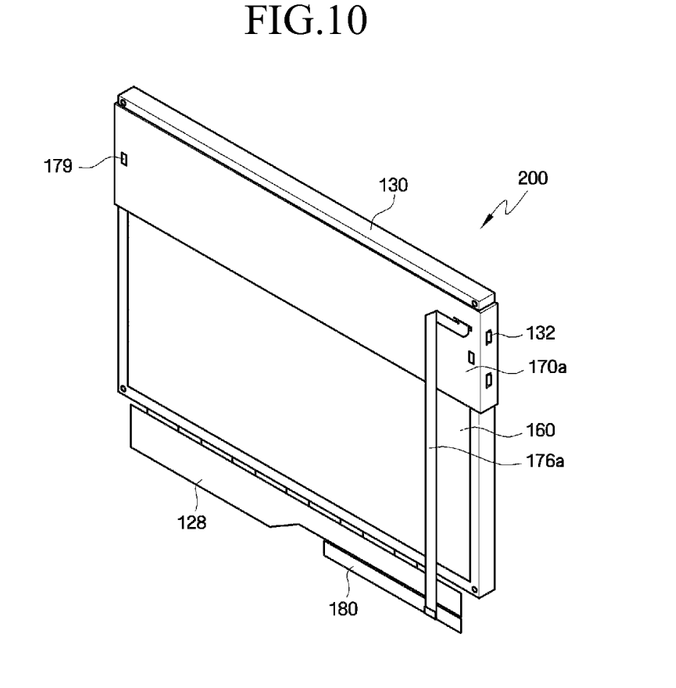
FIG. 10 is a rear perspective view illustrating an exemplary LCD module according to a second exemplary embodiment of the present invention

Next, an exemplary LCD module according to a second exemplary embodiment of the present invention will be described with reference to FIG. 10. FIG. 10 is a rear perspective view illustrating the exemplary LCD module according to the second exemplary embodiment of the present invention. For convenience of description, the same components as those according to the first exemplary embodiment are denoted by the same reference numerals. Therefore, a description thereof will be omitted, and only the difference therebetween will be described.

As shown in FIG. 10, in an exemplary LCD module 200 according to this embodiment, only the light source assembly 170a is provided at an upper part of the LCD module 200. In this case, a flat light guide plate, such as light guide plate 150, may be used, or a wedge-type light guide plate in which a portion adjacent to the light source assembly 170a has a larger thickness than an opposite portion of the wedge-type light guide plate may be used.

Figure 11:
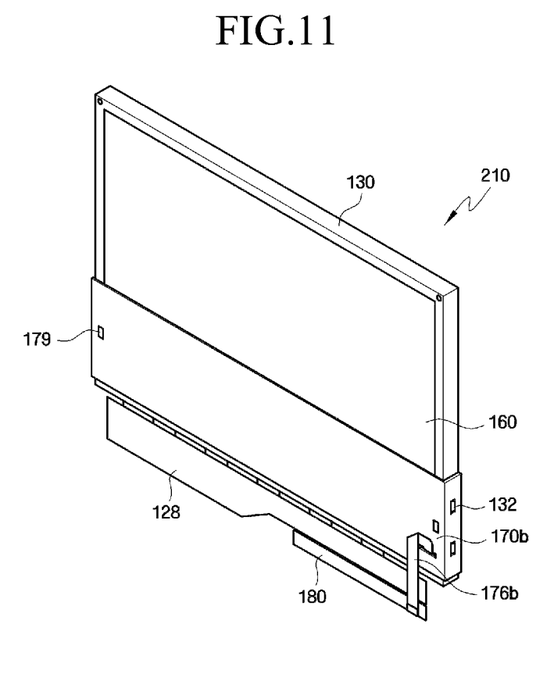
FIG. 11 is a rear perspective view illustrating an exemplary LCD module according to a third exemplary embodiment of the present invention.

Next, an exemplary LCD module according to a third exemplary embodiment of the present invention will be described with reference to FIG. 11. FIG. 11 is a rear perspective view illustrating the exemplary LCD module according to the third exemplary embodiment of the present invention. For convenience of description, the same components as those according to the first exemplary embodiment are denoted by the same reference numerals. Therefore, a detailed description of same or substantially similar elements will be omitted, and only the difference therebetween will be described.

As shown in FIG. 11, in an LCD module 210 according to this exemplary embodiment, only the light source assembly 170b is provided at a lower part of the LCD module 210. In this case, a flat light guide plate may be used, such as light guide plate 150, or a wedge-type light guide plate in which a portion adjacent to the light source assembly 170b has a larger thickness than an opposite portion of the wedge-type light guide plate may be used.

Figure 12:
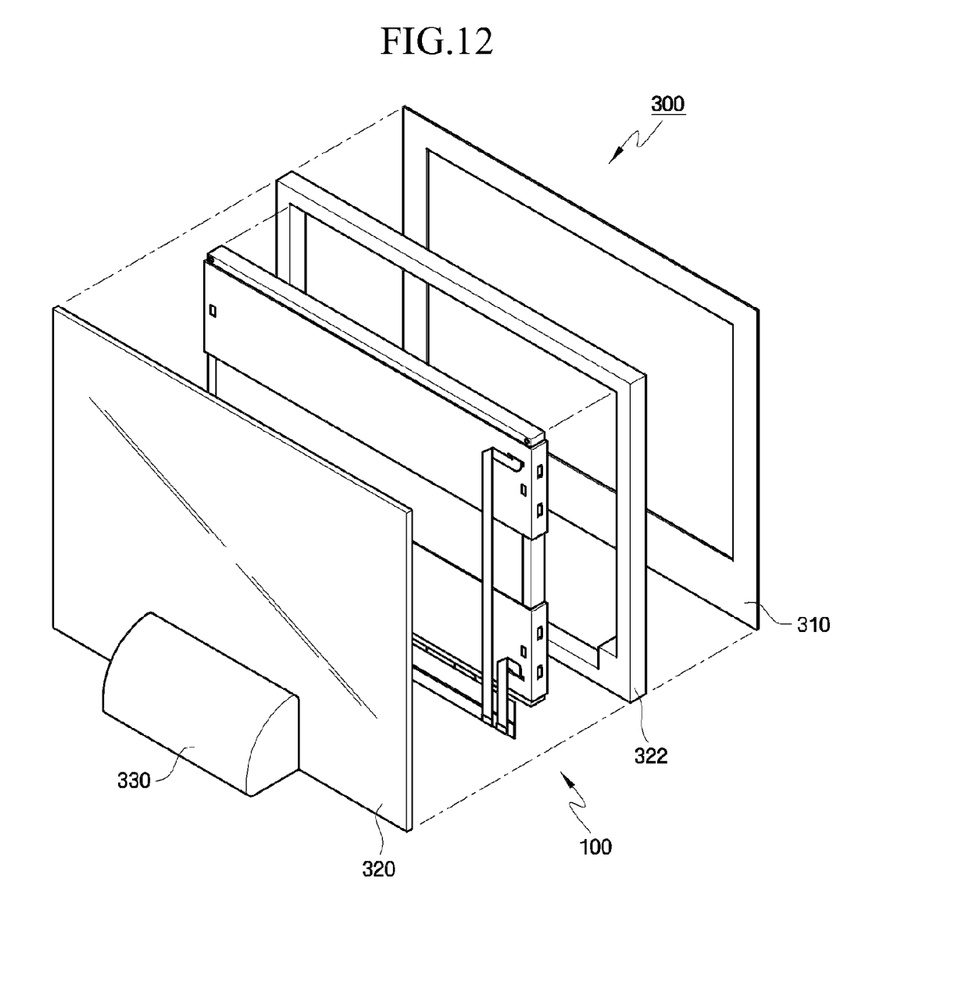
FIG. 12 is an exploded perspective view illustrating an exemplary display device set according to a fourth exemplary embodiment of the present invention.

Next, a display device set according to a fourth exemplary embodiment of the present invention will be described with reference to FIG. 12. FIG. 12 is an exploded perspective view illustrating the exemplary display device set according to the fourth exemplary embodiment of the present invention. For convenience of description, in this embodiment, the exemplary LCD module shown in FIG. 1 is used, but the present invention is not limited thereto. The LCD modules shown in FIGS. 10 and 11 may alternatively be used.

Referring to FIG. 12, a display device set 300 according to the fourth exemplary embodiment of the present invention includes the LCD module 100, a set frame 322 that surrounds the edge of the LCD module 100, a front case 310 that is coupled to the front surfaces of the LCD module 100 and the set frame 322, a rear case 320 that is coupled to the rear surfaces of the LCD module 100 and the set frame 322, and a supporting member 330 that is provided on the rear surface of the rear case 320 and supports the overall structure.

The set frame 322 has a thickness that is substantially equal to or larger than that of the LCD module 100, and a window through which an effective display area of the LCD module 100 is exposed is formed in the front case 310. A main board that supplies image signals to the source PCB 128 may be formed inside the supporting member 330.

In an exemplary embodiment, the display device set 300 may be assembled as follows.

First, the LCD module 100 is inserted into the set frame 322, and the front case 310 is adhered to the front surfaces of the LCD module 100 and the set frame 322 by a double-sided tape or an adhesive. Then, the rear case 320 is coupled to the rear surfaces of the LCD module 100 and the set frame 322 by, for example, screws.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A liquid crystal display module comprising:
a liquid crystal panel;
a mold frame which is below the liquid crystal panel and supports the liquid crystal panel;
a light guide plate which is below the mold frame and includes defined therein a first groove portion; and
a cover coupled to the mold frame,
wherein the cover includes a plate provided on a rear surface of the light guide plate and a side wall which is substantially perpendicular to the plate, and
wherein the mold frame includes:
a rectangular frame-shaped side portion elongated to face a side surface of the light guide plate;
a supporting portion which protrudes inwardly directly from the elongated side portion facing the side surface of the light guide plate, elongated to overlap the light guide plate at opposing corner portions of the light guide plate; and
at least one first guide protruding portion which protrudes directly from the elongated side portion and the elongated supporting portion and to be disposed in the first groove portion.

2. The liquid crystal display module of claim 1, wherein the first groove portion is disposed at an edge of the light guide plate.

3. The liquid crystal display module of claim 1, further comprising an optical sheet provided between the light guide plate and the mold frame,
wherein a second groove portion defined in the optical sheet, into which the first guide protruding portion is disposed, is disposed at an edge of the optical sheet.

4. The liquid crystal display module of claim 1,
wherein the mold frame further comprises first fixing pins disposed on the elongated supporting portion, and wherein the cover further includes defined therein first insertion holes into which the mold frame first fixing pins are inserted.

5. The liquid crystal display module of claim 4, further comprising a reflecting sheet provided between the light guide plate and the cover,
wherein the reflecting sheet includes defined therein second insertion holes into which the mold frame first fixing pins are inserted.

6. The liquid crystal display module of claim 1, further comprising:
a reflecting sheet provided between the light guide plate and the light source assembly; and
wherein the mold frame further comprises second fixing pins which press the reflecting sheet to fix the reflecting sheet to the cover.

7. The liquid crystal display module of claim 1, wherein the mold frame further includes fixing protruding portions that protrude inwardly from the elongated side portion facing the side surface of the light guide plate at a corner portion among the opposing corner portions of the light guide plate,
wherein an insertion space is formed between the fixing protruding portions and the elongated side portion at the corner portion of the light guide plate, and a portion of light source elements is inserted into the insertion space and is fixed therein.

8. The liquid crystal display module of claim 1, further comprising a fixing film adhered to a boundary between the liquid crystal panel and the mold frame.

9. The liquid crystal display module of claim 8, wherein the mold frame further comprises defined therein user holes disposed at corners of the mold frame and exposed from the fixing film.

10. The liquid crystal display module of claim 8, wherein the fixing film is a black tape or a conductive tape.

11. A liquid crystal display module comprising:
a liquid crystal panel;
a mold frame which is below the liquid crystal panel and supports the liquid crystal panel;
a light guide plate which is below the mold frame and includes a corner portion; and
a cover coupled to the mold frame,
wherein the cover includes a plate provided on a rear surface of the light guide plate and a side wall which is substantially perpendicular to the plate, and
wherein the mold frame includes:
a rectangular frame-shaped side portion facing a side surface of the light guide plate at opposing corner portions of the light guide plate;
a supporting portion which protrudes inwardly directly from the side portion facing the side surface of the light guide plate, elongated to overlap the light guide plate at the opposing corner portions of the light guide plate; and
at least one second guide protruding portion which protrudes inwardly directly from the side portion facing the side surface of the light guide plate, to face the side surface of the light guide plate at the corner portion of the light guide plate.

12. The liquid crystal display module of claim 11, wherein the corner portion is an area where two or more edges of the light guide plate meet.

* * * * *